(12) United States Patent
Piirainen et al.

(10) Patent No.: US 6,385,256 B1
(45) Date of Patent: May 7, 2002

(54) METHOD AND ARRANGEMENT FOR SIGNAL MODULATION

(75) Inventors: Olli Piirainen; Kari Niemelä, both of Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/355,748
(22) PCT Filed: Dec. 10, 1998
(86) PCT No.: PCT/FI98/00963
  § 371 Date: Oct. 13, 1999
  § 102(e) Date: Oct. 13, 1999
(87) PCT Pub. No.: WO99/33236
  PCT Pub. Date: Jul. 1, 1999

(30) Foreign Application Priority Data

Dec. 11, 1997 (FI) .................................................. 974496

(51) Int. Cl.[7] ............................................. H04L 27/12
(52) U.S. Cl. ...................... 375/306; 375/308; 332/117; 332/144; 455/112
(58) Field of Search ................................. 375/274, 283, 375/305, 306; 332/100, 103, 117, 144; 455/112

(56) References Cited

U.S. PATENT DOCUMENTS

| | | | |
|---|---|---|---|
| 4,601,048 A | | 7/1986 | Ryan |
| 5,048,058 A | | 9/1991 | Kaleh |
| 5,377,229 A | * | 12/1994 | Wilson et al. ............... 375/223 |
| 5,412,687 A | * | 5/1995 | Sutton et al. ............... 375/133 |
| 5,513,219 A | | 4/1996 | Ham |
| 5,541,953 A | * | 7/1996 | Hiben et al. ................. 327/557 |

FOREIGN PATENT DOCUMENTS

| | | |
|---|---|---|
| EP | 561 258 A1 | 9/1993 |
| WO | 97/29576 | 8/1997 |

OTHER PUBLICATIONS

Ryan, "Modem Design Using Continuous Phase Modulation with Coding", IEEE Military Communications Conference, Oct. 20–23, 1985, pp. 241–246.

\* cited by examiner

*Primary Examiner*—Amanda T. Le
(74) *Attorney, Agent, or Firm*—Pillsbury Winthrop LLP

(57) ABSTRACT

The invention relates to a method and arrangement for modulating a signal to be transmitted, the arrangement comprising an encoder and a frequency modulator. In order to enable high rate transmission in a flexible manner in a narrow frequency band, the encoder (104) is a differential encoder and before the frequency modulator, the arrangement comprises means for multiplying the signal to be transmitted by a factor of the form $\pi/(2m)$, where m is a positive integer greater than one.

11 Claims, 1 Drawing Sheet

METHOD AND ARRANGEMENT FOR SIGNAL MODULATION

FIELD OF THE INVENTION

The invention relates to a method for modulating a signal, the method using continuous phase modulation and comprising encoding and frequency modulation of a signal to be transmitted.

BACKGROUND OF THE INVENTION

A modulation method used on a transmission path is a significant parameter when new data transmission systems are developed. Because of losses occurring on the transmission path and because of transmission path capacity, data symbols cannot be transmitted over the transmission path as such, but the symbols must be modulated using a suitable method so as to obtain good transmission path capacity and transmission quality.

The bandwidth required by transmission is a significant factor particularly in radio systems. The aim is to achieve maximum transmission capacity by using a narrow bandwidth. On the other hand, the aim is to provide a transmitter and a receiver as easily and advantageously as possible. In radio systems, the aim is generally to use a modulation method having a constant envelope, because a C-class amplifier solution can then be used. The C-class amplifiers are simple in structure and advantageous in efficiency. This is particularly relevant as far as terminal power consumption is concerned.

There are several prior art modulation methods having a constant envelope, including Minimum Shift Keying MSK, Gaussian Minimum Shift Keying GMSK, Tamed Frequency Modulation TFM and Continuous Phase Modulation CPM. The GMSK method is used in the GSM cellular radio system. It has a narrow frequency spectrum and high performance, whereas data transmission rates are not very high. The coded CPM methods usually have a narrow frequency spectrum and high performance, making high data rates possible. However, equipments required become complex in structure, for which reason these methods have not been used in prior art systems.

BRIEF DESCRIPTION OF THE INVENTION

An object of the invention is to provide a method and arrangement implementing the method, enabling high data rate transmission in a narrow frequency band without complex equipments required. This is achieved by the method of the type described in the introduction, which is characterized in that the encoding performed is differential encoding and that a signal to be transmitted before the frequency modulation is multiplied by a factor of the form $\pi/(2m)$, where m is a positive integer greater than one.

The invention also relates to an arrangement for modulating a signal to be transmitted, the arrangement comprising an encoder and a frequency modulator. The arrangement of the invention is characterized in that the encoder is a differential encoder and that before the frequency modulator, the arrangement comprises means for multiplying the signal to be transmitted by a factor of the form $\pi/(2m)$, where m is a positive integer greater than one.

The preferred embodiments of the invention are disclosed in the dependent claims.

The method and arrangement of the invention provide many advantages. The number of feasible states on a unit circle can be minimized by using the selected factor, thus providing a receiver of reduced complexity. On the other hand, bit error ratio obtained by the method of the invention, indicating the ability of the system to tolerate errors, is higher than in GMSK, but if the transmission band remains unchanged, the data rates obtained are substantially higher. Consequently, the method of the invention enables more data to be transmitted using the same frequency band. As compared with the coded CPM methods, the equipments needed, the transceiver in particular, are substantially easier to implement.

BRIEF DESCRIPTION OF THE DRAWINGS

In the following, the invention will be described in more detail by means of preferred embodiments with reference to the accompanying drawings, in which.

DETAILED DESCRIPTION OF THE INVENTION

Figure 1:
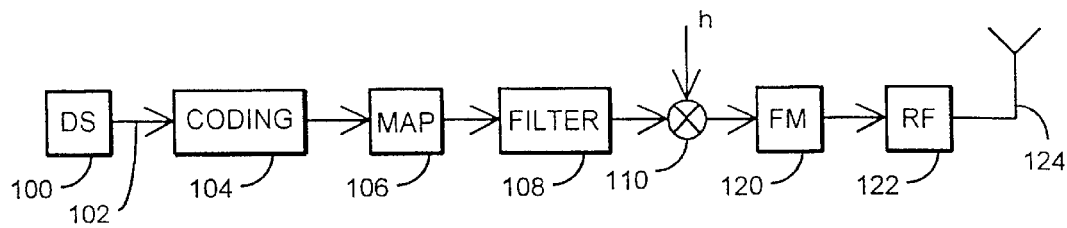
FIG. 1 is a block diagram illustrating a first example of the arrangement of the invention.

Let us first study an example of an advantageous structure of the arrangement of the invention by means of a block diagram presented in FIG. 1. The figure presents a radio system terminal structure essential to the invention. Naturally, in order to function, an apparatus to be implemented must also include other components apart from those presented in FIG. 1, as it is obvious to those skilled in the art. However, for the sake of clarity, they are not dealt with in the figure and description.

The arrangement comprises a data source 100 generating a digital signal 102 to be transmitted. The data source may be a microphone connected to a speech encoder, for example. In that case, the signal to be transmitted comprises speech in digital form. Other data sources may include a computer or a modem, for example. Let us assume herein that the signal to be transmitted is composed of data symbols $d_i=[0,1]$. Furthermore, let us assume that a symbol rate is 1/T, where T is the length of the data symbol. In the arrangement of the invention, the signal 102 is first applied to a differential encoder 104 differentially encoding each data symbol $d_i=[0,1]$. The output of the differential encoder thus includes the following symbols:

$$\hat{d}_i = d_i \oplus d_{i-1}$$

where $\oplus$ denotes modulo 2 addition. The encoded symbols are of the form 0 or 1. The values so obtained are further applied to converter means 106 performing conversion in which symbols $[-1, 1]$ represent the symbols $[0,1]$. In other words, the output of the converter means includes values $\alpha_i = 1 - 2\hat{d}_i$, where $\alpha_i \in \{-1, 1\}$.

In a preferred embodiment of the invention, the symbols so obtained are applied to a filter 108 filtering the signal in accordance with a spectral pattern desired. A transfer function following the Gaussian distribution can be preferably selected as the transfer function of the filter. In that case, the transfer function can be defined in the form $$g(t) = h(t) \otimes rect\left(\frac{t}{T}\right)$$

where t stands for time, $\oplus$ indicates convolution, and a function rect(x) is defined by $$rect\left(\frac{t}{T}\right) = \frac{1}{T} \text{ when } |t| < \frac{T}{2}$$

$$rect\left(\frac{t}{T}\right) = 0 \text{ otherwise.}$$

When the Gaussian distribution is used, a function h(t) can be selected by $$h(t) = \frac{e^{\left(\frac{-t^2}{2\sigma^2 T^2}\right)}}{\sqrt{2\pi}\,\sigma T}$$

where $$\sigma = \frac{\sqrt{\ln(2)}}{2\pi BT}$$

and BT=β.

Herein, B stands for a 3-dB bandwidth of the filter with the impulse response h(t) and T is thus the length of the data symbol.

The signal so obtained is further applied to a multiplier 110 to be multiplied by a factor h of the form π/(2m), where m is a positive integer greater than one. The signal so obtained is further applied to a frequency modulator 120 performing prior art frequency modulation using a voltage-controlled or a numerically controlled oscillator, for example. The phase of the modulated signal is in the form $$\varphi(t') = \sum_i \alpha_i h \int_{-\infty}^{t-iT} g(u)du$$

where h is thus of the form π(2m), m=2, 3, 4, . . . A time reference t' is the start of the data to be transmitted.

The modulated signal is further applied to radio frequency parts 122 which can be implemented according to the prior art. It is an advantage of the invention that the radio frequency parts of the GSM system, for example, can be used as the radio frequency parts, although when the modulation method of the invention is used and m is given a value 2, the data rate T can be doubled as compared with the GSM system. The modulated RF signal can be expressed in the form $$x(t') = \sqrt{\frac{2E_c}{T}} \cos(2\pi f_0 t' + \varphi(t') + \varphi_0)$$

where $E_c$ is the energy of a modulating symbol, $f_0$ is a centre frequency and $\phi_0$ is a random phase which is constant for a period of one burst. In the radio frequency parts, a C-class amplifier can be used, which is a significant advantage particularly as far as portable terminals are concerned.

The signal is applied from the radio frequency parts to an antenna 124.

As the transfer function of the filter 108, a raised cosine-type function, for example a root raised cosine RRC, can also be advantageously selected.

Figure 2:
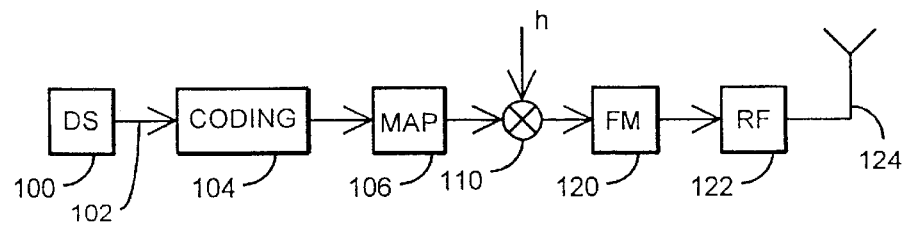
FIG. 2 is a block diagram illustrating a second example of the arrangement of the invention.

FIG. 2 illustrates a second embodiment of the invention. In this embodiment, no filter exists after the encoder. In other respects, the solution is similar to the above-described solution.

Figure 3:
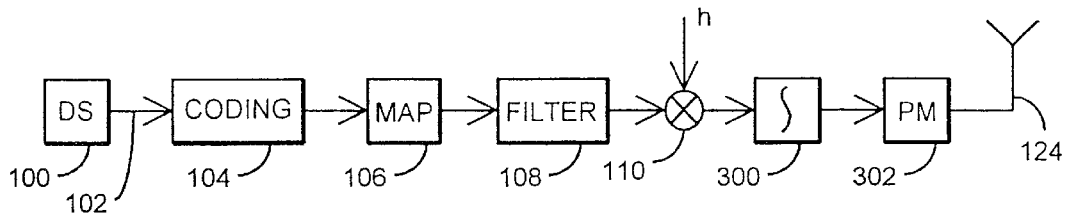
FIG. 3 is a block diagram illustrating a third example of the arrangement of the invention.

FIG. 3 illustrates a third alternative embodiment of the invention. In this embodiment, the voltage-controlled oscillator of FIG. 1 is replaced by an integrator 300 and a phase modulator 302, from which the signal is further applied to the radio frequency parts. In other respects, the solution is similar to the one described in connection with FIG. 1.

Figure 4:
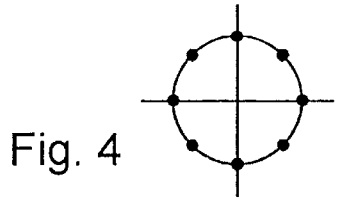
FIG. 4 shows an example of a feasible state diagram of the modulation method of the invention.

FIG. 4 shows an example of a feasible state diagram of the modulation method of the invention, when m=2. Transitions of the state diagram form a unit circle, since a modulation method with a constant amplitude is in question and origins and terminals of transitions are indicated by dots on the unit circle. The dots are π/4 phase difference away from one another in accordance with the h selected.

Figure 5:
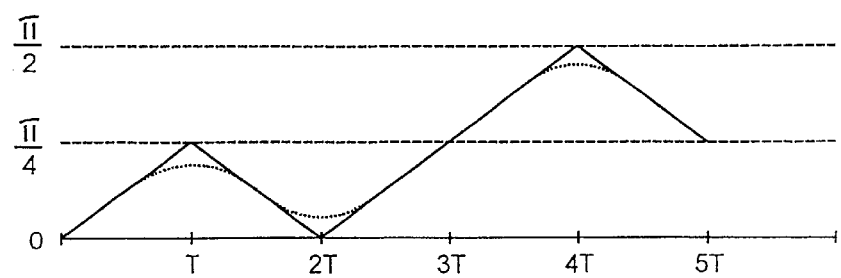
FIG. 5 shows an example of a feasible phase trajectory of the modulation method of the invention.

FIG. 5 shows an example of a feasible phase trajectory of the modulation method of the invention, when m=2. Naturally, the phase trajectory depends on the symbols to be transmitted, the example showing one example thereof. During each symbol, the phase thus changes π/4 in either direction depending on the symbol. In the figure, a solid line indicates the phase trajectory generated by the arrangement of FIG. 2, in which phase trajectory no filtering exists. Phase changes are in that case sharp, and the frequency ;spectrum then becomes wider. A dotted line indicates the phase trajectory generated by the arrangement of FIG. 1, in which phase trajectory phase changes are not that sharp because of the filtering. In that case, the frequency spectrum is narrower.

As compared with MSK, for example, in which the phase change is π/2 in either direction, the method of the invention is more sensitive to errors occurring on the transmission path because of smaller phase differences. However, it is a significant advantage of the method of the invention that because of smaller frequency changes, the frequency band required becomes narrower during transmission of the same data rate. Consequently, if the frequency band remains unchanged, the data rate can be increased.

Although the invention is described above with reference to the example according to the accompanying drawings, it is obvious that the invention is not restricted thereto, but it can be modified in a variety of ways within the scope of the inventive idea disclosed in the attached claims.

What is claimed is:

1. A method for modulating a signal, the method using continuous phase modulation and comprising encoding and frequency modulation of a signal to be transmitted, characterized in that the encoding performed is differential encoding and that a signal to be transmitted before the frequency modulation is multiplied by a factor of the form π/(2m), where m is a positive integer greater than one.

2. A method as claimed in claim 1, characterized in that after the encoding, the signal to be transmitted is filtered.

3. A method as claimed in claim 2, characterized in that the transfer function of a filter follows the Gaussian distribution.

4. A method as claimed in claim 2, characterized in that the transfer function of the filter is a raised cosine-type function.

5. A method as claimed in claim 1, characterized in that the frequency modulation is performed using a voltage-controlled oscillator.

6. A method as claimed in claim 1, characterized in that the frequency modulation is performed using an integrator and a phase modulator.

7. A method as claimed in claim 1, characterized in that encoded symbols are of the form 0 or 1 and that to the encoded symbols, conversion is performed in which symbols 1 and −1 represent the symbols 0 and 1.

8. An arrangement for modulating a signal to be transmitted, the arrangement comprising an encoder (104) and a frequency modulator (120), characterized in that the encoder (104) is a differential encoder and that before the frequency modulator (120), the arrangement comprises means (110) for multiplying the signal to be transmitted by a factor of the form $\pi/(2m)$, where m is a positive integer greater than one.

9. An arrangement as claimed in claim 8, characterized in that the arrangement comprises a filter (108) which is operationally connected to the output of the encoder.

10. An arrangement as claimed in claim 8, characterized in that the frequency modulator (120) is implemented using a voltage-controlled oscillator.

11. An arrangement as claimed in claim 8, characterized in that the frequency modulator (120) is implemented using an integrator (300) and a phase modulator (302).

\* \* \* \* \*